United States Patent
Ohkubo

(10) Patent No.: US 7,280,462 B2
(45) Date of Patent: Oct. 9, 2007

(54) METHOD AND APPARATUS FOR RECORDING/REPRODUCING OPTICAL INFORMATION

(75) Inventor: Shuichi Ohkubo, Tokyo (JP)

(73) Assignee: NEC Corporation (JP)

( * ) Notice: Subject to any disclaimer, the term of this patent is extended or adjusted under 35 U.S.C. 154(b) by 81 days.

(21) Appl. No.: 10/511,668

(22) PCT Filed: Apr. 17, 2003

(86) PCT No.: PCT/JP03/04882

§ 371 (c)(1),
(2), (4) Date: Oct. 18, 2004

(87) PCT Pub. No.: WO03/088224

PCT Pub. Date: Oct. 23, 2003

(65) Prior Publication Data

US 2005/0157633 A1    Jul. 21, 2005

(30) Foreign Application Priority Data

Apr. 17, 2002    (JP)    ............................. 2002-115448

(51) Int. Cl.
*G11B 7/24*    (2006.01)
(52) U.S. Cl. ................. 369/275.4; 369/59.11
(58) Field of Classification Search ............... None
See application file for complete search history.

(56) References Cited

U.S. PATENT DOCUMENTS 5,581,539 A * 12/1996 Horie et al. ............. 369/275.4
5,745,475 A * 4/1998 Ohno et al. .............. 369/275.4
6,411,592 B1 * 6/2002 Nishiuchi et al. ........ 369/275.4
6,580,678 B2 * 6/2003 Kondo et al. ............ 369/275.2
2003/0053404 A1 * 3/2003 Kondo ..................... 369/275.4

FOREIGN PATENT DOCUMENTS

| JP | 57-050330 | 3/1982 |
| JP | 7-121878 | 5/1995 |
| JP | 8-007282 | 1/1996 |
| JP | 09-073665 | 3/1997 |
| JP | 9-167348 | 6/1997 |

(Continued)

*Primary Examiner*—Wayne Young
*Assistant Examiner*—Lixi Chow
(74) *Attorney, Agent, or Firm*—Ostrolenk, Faber, Gerb & Soffen, LLP

(57) ABSTRACT

A substrate (1) having a guide groove for tracking with spot irradiation light beam for recording/reproduction of information is provided with a recording layer (2) and a light transmitting layer (3). The recording layer (2) is irradiated with a spot light beam through the light transmitting layer (3) to record information on both a first portion (L') of the recording layer corresponding to a flat section (L) between adjacent guide grooves and a second portion (G') of the recording layer corresponding to a guide groove inside (G). Recording marks with mark lengths of nT–mT (where T is a unit length, n, m are integers of one or more, n<m) are formed on the first and second portions (L', G'). The amplitude IL1 of a reproduced signal from the longest recording mark with the mark length of mT recorded on the first portion (L') and the amplitude IL2 of a reproduced signal from the longest recording mark with the mark length of mT recorded on the second portion (G') satisfy the relation $1<(IL1/IL2)<1.3$.

4 Claims, 3 Drawing Sheets

FOREIGN PATENT DOCUMENTS

| | | |
|---|---|---|
| JP | 09-198716 | 7/1997 |
| JP | 09-265658 | 10/1997 |
| JP | 10-064120 | 3/1998 |
| JP | 10-083536 | 3/1998 |
| JP | 11-134720 | 5/1999 |
| JP | 2002-008269 | 1/2002 |

* cited by examiner

METHOD AND APPARATUS FOR RECORDING/REPRODUCING OPTICAL INFORMATION

CROSS REFERENCE TO RELATED APPLICATION

This is a U.S. National stage of application No. PCT/JP2003/004882, filed on Apr. 17, 2003. Priority is claimed on that application and on the following application:

Country: Japan, Application No. 2002-115448, Filed: Apr. 17, 2002

The PCT International application was published in the Japanese language.

TECHNICAL FIELD

The present invention relates to an optical information recording medium with respect to which information is recorded/reproduced using light such as laser light, further to an optical information recording/reproducing method and an optical information recording/reproducing apparatus using the medium, particularly to an optical information recording medium in which information is recorded both in a portion corresponding to the inside of a guide groove for tracking and a portion corresponding to a portion between adjacent guide grooves with respect to a recording layer disposed on the surface of a substrate having the guide groove for tracking, and a method and apparatus for recording/reproducing optical information using the medium.

BACKGROUND ART

As optical information recording mediums to record/reproduce information by irradiation with laser light, a magneto-optical disk (MO), a write-once read-many compact disk (CD-R), a rewritable compact disk (CD-RW), a write-once read-many digital video disk (DVD-R), a rewritable digital versatile disk (DVD-RAM), a rewritable digital versatile disk (DVD-RW) and the like have been generally known. As means for raising recording densities in the optical information recording mediums, land/groove recording has been known in which the recording is performed in recording layer portions corresponding to both a flat portion (land) between adjacent guide grooves for tracking, the guide grooves being formed into substantially circular shapes in parallel with one another in a substrate surface, and the inside (groove) of each guide groove (JP(A)-57-50330, JP(A)-9-73665, JP(A)-9-198716, JP(A)-10-64120 and the like).

Moreover, in recent years, as a method of raising a recording density, a technique has been proposed in which a numerical aperture (NA) of an objective lens of an optical head constituting an apparatus for recording/reproducing information is raised to about 0.85. When the NA is raised, a beam diameter in condensing laser light can be reduced, and therefore it is possible to record/reproduce a finer mark. When the NA is raised in this manner, instead of applying the laser light to a recording layer through a substrate having a thickness of 0.6 to 1.2 mm as in a conventional technique, a light-transmitting layer having a thickness of about 0.1 mm is formed on the recording layer of the optical information recording medium, and the laser light can be applied to the recording layer on the substrate via the light-transmitting layer to record and reproduce information.

It is considered that the recording density is significantly increased by combining these techniques, that is, by performing the land/groove recording by use of a high-NA optical head.

However, according to findings of the present inventors, in the case where the land/groove recording is performed using the high-NA optical head, there is a problem that an optical resolution differs with the recording in a recording layer portion corresponding to the flat portion between the guide grooves and the recording in a recording layer portion corresponding to the inside of the guide groove. Concretely, when the recording is performed in the recording layer portion corresponding to the flat portion between the guide grooves, a drop of a signal amplitude (on the basis of the signal amplitude of a long mark) becomes more remarkable following a decrease of mark length, as compared with a case where the recording is performed in the recording layer portion corresponding to the inside of the guide groove.

FIG. 5 is a diagram showing a relation between the mark length shown on the abscissa and the signal amplitude shown on the ordinate. This figure shows a result of the recording performed with respect to an optical disk having a phase change type recording layer by the use of an optical head having a wavelength of 405 nm and NA=0.85. In the phase change type optical disk used in the present experiment, a phase difference between reflected lights before/after the recording is substantially 0. A line segment denoted with reference numeral 27 shows a case where the recording is performed with respect to a portion corresponding to the inside of a guide groove, and a line segment 28 shows a case where the recording is performed with respect to one end portion of a portion corresponding to a flat portion between the guide grooves. When the signal amplitude in a short mark remarkably drops in the recording into the portion corresponding to the flat portion between the guide grooves, a sufficient signal quality is not obtained, and therefore a problem has occurred that the high-density recording cannot be performed. An optical resolution in a case where the recording is performed with respect to the portion corresponding to the flat portion between the guide grooves needs to be improved in order that the recording is performed with respect to the portion corresponding to the inside of the guide groove and the portion corresponding to the flat portion between the guide grooves in such a manner as to raise the recording density.

It is to be noted that this problem is not limited to the only case where the information is recorded and reproduced with respect to the recording layer through the light-transmitting layer. Even in a case where the laser light is applied to the substrate from its back surface in the same manner as in the conventional DVD, when the recording density is raised, that is, when a shortest mark length recorded into the disk shortens, the problem becomes remarkable. The remarkable drop of the signal amplitude in the short mark does not depend on whether the recording is performed into the portion corresponding to the flat portion between the guide grooves or the portion corresponding to the inside of the guide groove, and depends on an incidence direction of the laser light. That is, when the recording layer is irradiated with the laser light through the light-transmitting layer, the drop of the signal amplitude in the short mark recorded in the portion corresponding to the flat portion between the guide grooves becomes remarkable. When the laser light is applied through the substrate, the signal amplitude drop of the short mark recorded in the portion corresponding to the inside of the guide groove becomes remarkable.

DISCLOSURE OF THE INVENTION

The present invention has been developed in consideration of the above-described problems, and an object thereof is to provide an optical information recording medium capable of setting recording and reproducing characteristics of a portion corresponding to a flat portion between guide grooves to be substantially equal to those of a portion corresponding to the inside of the guide groove, thereby raising a track density, and further enhancing a linear recording density to make it possible to perform recording with a high density in a case where the recording is performed into both a recording layer portion corresponding to the flat portion between the guide grooves and a recording layer portion corresponding to the inside of the guide groove at a high recording density.

In order to attain the above object, according to the present invention, there is provided an optical information recording medium in which light is projected in a spot to thereby record/reproduce information and in which at least a recording layer and a light-transmitting layer are disposed in this order on a substrate having a guide groove for tracking of the spotted light and in which the light is projected in the spot to the recording layer from the side of the light-transmitting layer to record the information both in a first portion of the recording layer corresponding to a flat portion between mutually adjacent guide grooves and a second portion of the recording layer corresponding to the inside of the guide groove, and the optical information recording medium has the following features:

(1) Recording marks with mark lengths nT to mT (where T is a unit length, n, m are integers of one or more, n<m) are formed on both the first and second portions, and an amplitude IL1 of a reproduced signal from the longest recording mark with the mark length mT recorded on the first portion, and an amplitude IL2 of a reproduced signal from the longest recording mark with the mark length mT recorded on the second portion satisfy a relation of 1<(IL1/IL2)<1.3;

(2) Recording marks with mark lengths nT to mT (where T is a unit length, n, m are integers of one or more, n<m) are formed on both the first and second portions, and an amplitude IL1 of a reproduced signal from the longest recording mark with the mark length mT recorded on the first portion, an amplitude IS1 of a reproduced signal from the shortest recording mark with the mark length nT recorded on the first portion, an amplitude IL2 of a reproduced signal from the longest recording mark with the mark length mT recorded on the second portion, and an amplitude IS2 of a reproduced signal from the shortest recording mark with the mark length nT recorded on the second portion satisfy a relation of $0.7<(IS1/IL1)/(IS2/IL2)<1$;

(3) Reflectance of the recording layer drops when the recording is performed with respect to the recording layer, and a difference $\Delta\phi=\phi a-\phi c$ between a phase $\phi a$ of reflected light after the recording and a phase $\phi c$ of the reflected light before the recording satisfies a relation of $0°<\Delta\phi\leq 15°$; or (4) A reflectance of the recording layer increases when the recording is performed with respect to the recording layer, and a difference $\Delta\phi=\phi a-\phi c$ between a phase $\phi a$ of reflected light after the recording and a phase $\phi c$ of the reflected light before the recording satisfies a relation of $-15°\leq\Delta\phi<0°$.

In order to attain the above object, according to the present invention, there is also provided an optical information recording medium in which light is projected in a spot to thereby record/reproduce information and in which at least a recording layer is disposed on a substrate having a guide groove for tracking of the spotted light and in which the light is projected in the spot to the recording layer from the side of the substrate to record the information both in a first portion of the recording layer corresponding to a flat portion between mutually adjacent guide grooves and a second portion of the recording layer corresponding to the inside of the guide groove, and the optical information recording medium has the following features:

(5) Recording marks with mark lengths nT to mT (where T is a unit length, n, m are integers of one or more, n<m) are formed on both the first and second portions, and an amplitude IL1 of a reproduced signal from the longest recording mark with the mark length mT recorded on the first portion, and an amplitude IL2 of a reproduced signal from the longest recording mark with the mark length mT recorded on the second portion satisfy a relation of 1<(IL2/IL1)<1.3;

(6) Recording marks with mark lengths nT to mT (where T is a unit length, n, m are integers of one or more, n<m) are formed on both the first and second portions, and an amplitude IL1 of a reproduced signal from the longest recording mark with the mark length mT recorded on the first portion, an amplitude IS1 of a reproduced signal from the shortest recording mark with the mark length nT recorded on the first portion, an amplitude IL2 of a reproduced signal from the longest recording mark with the mark length mT recorded on the second portion, and an amplitude IS2 of a reproduced signal from the shortest recording mark with the mark length nT recorded on the second portion satisfy a relation of $0.7<(IS2/IL2)/(IS1/IL1)<1$;

(7) A reflectance of the recording layer drops when the recording is performed with respect to the recording layer, and a difference $\Delta\phi=\phi a-\phi c$ between a phase $\phi a$ of reflected light after the recording and a phase $\phi c$ of the reflected light before the recording satisfies a relation of $0°<\Delta\phi\leq 15°$; or (8) A reflectance of the recording layer increases when the recording is performed with respect to the recording layer, and a difference $\Delta\phi=\phi a-\phi c$ between a phase $\phi a$ of reflected light after the recording and a phase $\phi c$ of the reflected light before the recording satisfies a relation of $-15°\leq\Delta\phi<0°$.

In the above optical information recording medium, the recording layer is, for example, formed of a material whose optical reflectance or phase changes by irradiation with laser light.

In order to attain the above object, according to the present invention, there is also provided the following methods of recording/reproducing optical information:

A method of recording/reproducing optical information, comprising the steps of: projecting light in spots with respect to both first and second portions of a recording layer of the above optical information recording medium (1); and forming recording marks having mark lengths nT to mT to perform recording, so that IL1 and IL2 satisfy a relation of 1<(IL1/IL2)<1.3;

A method of recording/reproducing optical information, comprising the steps of: projecting light in spots with respect to both first and second portions of a recording layer of the above optical information recording medium (2); and forming recording marks having mark lengths nT to mT to perform recording, so that IL1, IS1, IL2 and IS2 satisfy a relation of $0.7<(IS1/IL1)/(IS2/IL2)<1$;

A method of recording/reproducing optical information, comprising the steps of: projecting light in spots with respect to both first and second portions of a recording layer of the above optical information recording medium (3) or (7); lowering a reflectance of the recording layer; and forming recording marks having mark lengths nT to mT to perform recording, so that $\Delta\phi$ satisfies a relation of $0°<\Delta\phi\leq 15°$;

A method of recording/reproducing optical information, comprising the steps of: projecting light in spots with respect to both first and second portions of a recording layer of the above optical information recording medium (4) or (8); increasing a reflectance of the recording layer; and forming recording marks having mark lengths nT to mT to perform recording, so that $\Delta\phi$ satisfies a relation of $-15° \leq \Delta\phi < 0°$.

A method of recording/reproducing optical information, comprising the steps of: projecting light in spots with respect to both first and second portions of a recording layer of the above optical information recording medium (5); and forming recording marks having mark lengths nT to mT to perform recording, so that IL1 and IL2 satisfy a relation of $1 < (IL2/IL1) < 1.3$.

A method of recording/reproducing optical information, comprising the steps of: projecting light in spots with respect to both first and second portions of a recording layer of the above optical information recording medium (6); and forming recording marks having mark lengths nT to mT to perform recording, so that IL1, IS1, IL2 and IS2 satisfy a relation of $0.7 < (IS2/IL2)/(IS1/IL1) < 1$; and A method of recording/reproducing optical information, having a step of projecting light in spots using an objective lens with respect to both first and second portions of a recording layer using any one of the above optical information recording mediums (1) to (8), wherein assuming that a wavelength of the light is $\lambda$, a numerical aperture of the objective lens is NA, and a shortest mark length of the recording mark is ML, $0.25 < NA \bullet ML/\lambda < 0.38$ is established.

In order to attain the above object, according to the present invention, there is also provided an optical information recording/reproducing apparatus having an optical head which projects light in spots with respect to both first and second portions of a recording layer using the above optical information recording medium. The optical head has, for example, an objective lens having a numerical aperture of 0.8 to 0.9. The optical head has, for example, a laser light source which emits the light having a wavelength $\lambda$, and an objective lens having a numerical aperture NA, and the optical head forms the recording mark in such a manner as to establish $0.25 < NA \bullet ML/\lambda < 0.38$ assuming that a shortest mark length of the recording mark formed by irradiation with the light is ML.

BEST MODE FOR CARRYING OUT THE INVENTION

Embodiments of the present invention will be described hereinafter with reference to the drawings.

Figure 1:
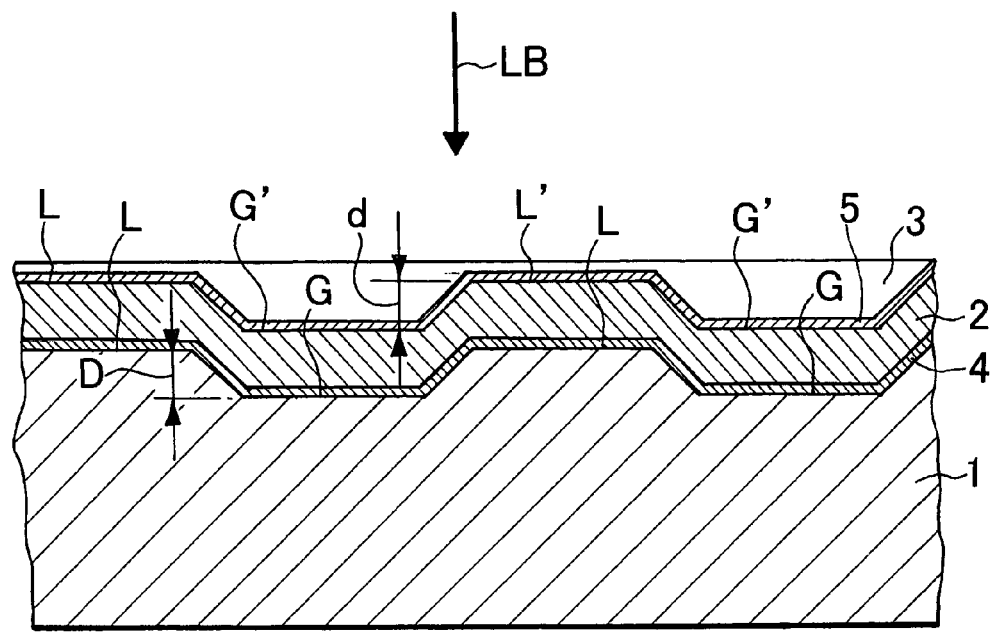
FIG. 1 is a partially enlarged sectional view of an optical information recording medium according to the present invention.

FIG. 1 is a partially enlarged sectional view showing one embodiment of an optical information recording medium according to the present invention. Guide grooves for tracking, extended in substantially circular shapes around a substrate center, are formed in the surface (upper surface) of a disc-shaped support substrate 1 having a thickness of about 1.2 mm, and a flat portion (land) L is formed between mutually adjacent guide grooves. The inside (bottom portion) of the guide groove for tracking is especially shown as a groove G. A depth (groove depth) of the groove G to the land L is D. A width of the land L is typically substantially equal to that of the groove G preferably within an error of 10%. Moreover, an arrangement pitch of the groove G is, for example, 0.5 to 1.2 µm.

A dielectric layer 4 is formed on the upper surface of the substrate 1, a recording layer 2 in which optical information is recorded is formed on the dielectric layer 4, a dielectric layer 5 is formed on the recording layer 2, and a light-transmitting layer 3 is formed on the dielectric layer 5. Laser light LB is applied from a light-transmitting layer 3 side, and information is recorded/reproduced with respect to the recording layer 2. Materials such as polycarbonate (PC) and aluminum (Al) can be used for the substrate 1. The recording layer 2 has a thickness of about 0.1 mm, and may be a film of PC bonded by an ultraviolet cured resin or the like, or a layer formed of the ultraviolet cured resin having a thickness of about 0.1 mm.

For the recording layer 2, a material whose optical reflectance or phase changes by irradiation with the laser light, for example, a known phase change type recording material such as GeSbTe, a known photo refractive material or the like can be used. The recording layer 2 has a concave/convex shape corresponding to a land/groove shape of the surface of the substrate 1, and a portion (i.e., first portion) L' corresponding to a substrate land L, and a portion (i.e., second portion) G' corresponding to a substrate groove G are formed. A depth (groove depth) of the portion G' corresponding to the groove with respect to the portion L' corresponding to the land in the upper surface of the recording layer 2 is d. Typically, the thickness of the recording layer 2 in the portion L' corresponding to the land is equal to that in the portion G' corresponding to the groove. Furthermore, since the thicknesses of the dielectric layers 4, 5 in the portion corresponding to the land are similarly equal to those in the portion corresponding to the groove, the above-described groove depth d is substantially equal to D. The thickness of the recording layer 2 is, for example, 10 to 30 nm, preferably 10 to 20 nm. In addition to functions of protective layers, the dielectric layers 4, 5 also have functions of contributing to realization of a recording medium of one of a low-to-high (L-H) recording system (the recording system in which a reflectance of the recording layer after the recording is higher than that before the recording) and a high-to-low (H-L) recording system (the recording system in which the reflectance of the recording layer after the recording is lower than that before the recording), when layer constitutions (including the thicknesses of the dielectric layers 4, 5) including these layers are appropriately set. Furthermore, the dielectric layers 4, 5 also have functions of contributing to exertion of characteristics of the present invention described later, when the thicknesses or the layer constitutions are appropriately set.

If necessary, a metal layer as a reflective film may be provided between the upper surface of the substrate 1 and the dielectric layer 4.

The information is recorded/reproduced with respect to both the portion G' corresponding to the groove and the portion L' corresponding to the land of the recording layer 2 in the L-H recording system or the H-L recording system. To realize the L-H recording system or the H-L recording system, the respective layers, the film thicknesses, and other layer constitutions are appropriately set in accordance with a known design method.

Figure 2:
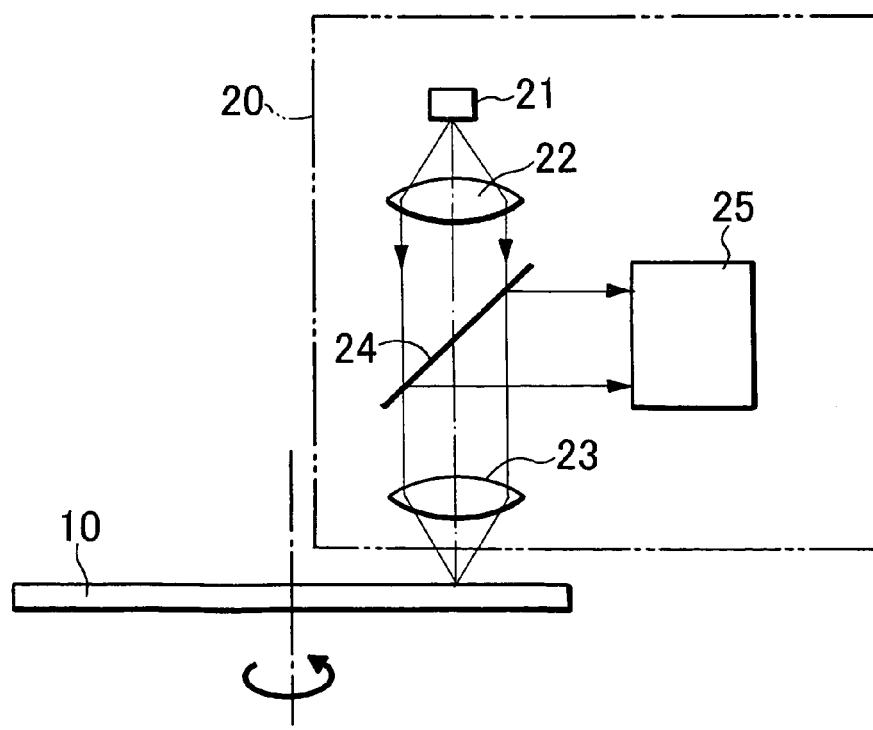
FIG. 2 is a schematic diagram showing a method and apparatus for recording/reproducing information with respect to the optical information recording medium according to the present invention.

FIG. 2 is a schematic diagram showing embodiments of a method and an apparatus for recording/reproducing the information with respect to the above-described optical information recording medium. An optical information recording medium 10 rotates around a rotation center of a vertical direction passing through the center of the medium. An optical head 20 constituting a recording/reproducing apparatus is disposed above the recording medium 10. In the optical head 20, the laser light emitted from a semiconductor laser 21 which is a light source is applied in a spot shape to the portion G' corresponding to the groove or the portion L' corresponding to the land of the recording layer 2 of the recording medium 10 through a collimate lens 22 and an objective lens 23. The recording laser light is modulated in an appropriate modulation system in accordance with recording information. The reflected light from the recording medium 10 reaches an optical detection system 25 via the objective lens 23 and a beam splitter 24. A reproduction signal, a tracking signal or the like is obtained by the optical detection system 25. In the optical detection system 25, a quantity of light or a phase of the reflected light from the recording layer 2 can be detected to obtain a required electric signal. A wavelength $\lambda$ of the laser light applied from the semiconductor laser 21 is, for example, 390 to 680 nm, preferably 390 to 440 nm. As the objective lens 23, a lens having a large numerical aperture (NA), for example, of 0.6 to 0.9, preferably 0.8 to 0.9 is used.

It is to be noted that the present invention is not limited to the application of the laser light from the side of the light-transmitting layer 3, and the laser light may be applied from the side of the substrate 1. In this case, a light-transmitting substrate is used as the substrate 1. Since the thickness of the dielectric layer 4 of the portion corresponding to the land L is typically equal to that of the portion corresponding to the groove G as described above, the depth (groove depth) of the portion L' corresponding to the land with respect to the portion G' corresponding to the groove is substantially D in the lower surface of the recording layer 2. When the reflective layer is formed, the layer is disposed on the recording layer 2 via the dielectric layer 5. Also in this case, the information is recorded/reproduced with respect to both the portion G' corresponding to the groove and the portion L' corresponding to the land of the recording layer 2 in the L-H recording system or the H-L recording system.

Therefore, when the laser light is applied from the light-transmitting layer 3 side to record/reproduce the information into the recording layer 2 in the present invention, any of the following characteristics ① to ④ is held.

① When recording -marks having mark lengths nT to mT (T is a unit length, n, m are integers of one or more, n<m: this also applies to the following) are formed using a certain modulation system, a reproduction signal amplitude IL1 of a longest mark mT recorded in the portion L' corresponding to the land, and a reproduction signal amplitude IL2 of the longest mark mT recorded in the portion G' corresponding to the groove satisfy a relation of 1<(IL1/IL2)<1.3. The modulation system is a system similar to a modulation system in the case of recording/reproducing of information with respect to a conventional optical information recording medium, for example, a (1-7) modulation system, and has heretofore been known, and the present invention can be applied to any of these known modulation systems.

② When the nT to mT recording marks are formed using a certain modulation system, the reproduction signal amplitude IL1 of the longest mark mT recorded in the portion L' corresponding to the land, a reproduction signal amplitude IS1 of a shortest mark nT recorded in the portion L' corresponding to the land, the reproduction signal amplitude IL2 of the longest mark mT recorded in the portion G' corresponding to the groove, and a reproduction signal amplitude IS2 of the shortest mark nT recorded in the portion G' corresponding to the groove satisfy a relation of 0.7<(IS1/IL1)/(IS2/IL2)<1.

③ When the recording is performed with respect to the recording layer 2, a reflectance of the recording layer 2 drops, and a difference $\Delta\phi=\phi a-\phi c$ between a phase $\phi a$ of reflected light after the recording and a phase $\phi c$ of the reflected light before the recording satisfies a relation of $0°<\Delta\phi\leq15°$.

④ When the recording is performed with respect to the recording layer 2, the reflectance of the recording layer 2 increases, and the difference $\Delta\phi=\phi a-\phi c$ between the phase $\phi a$ of the reflected light after the recording and the phase $\phi c$ of the reflected light before the recording satisfies a relation of $-15°\leq\Delta\phi<0°$.

Figure 3:
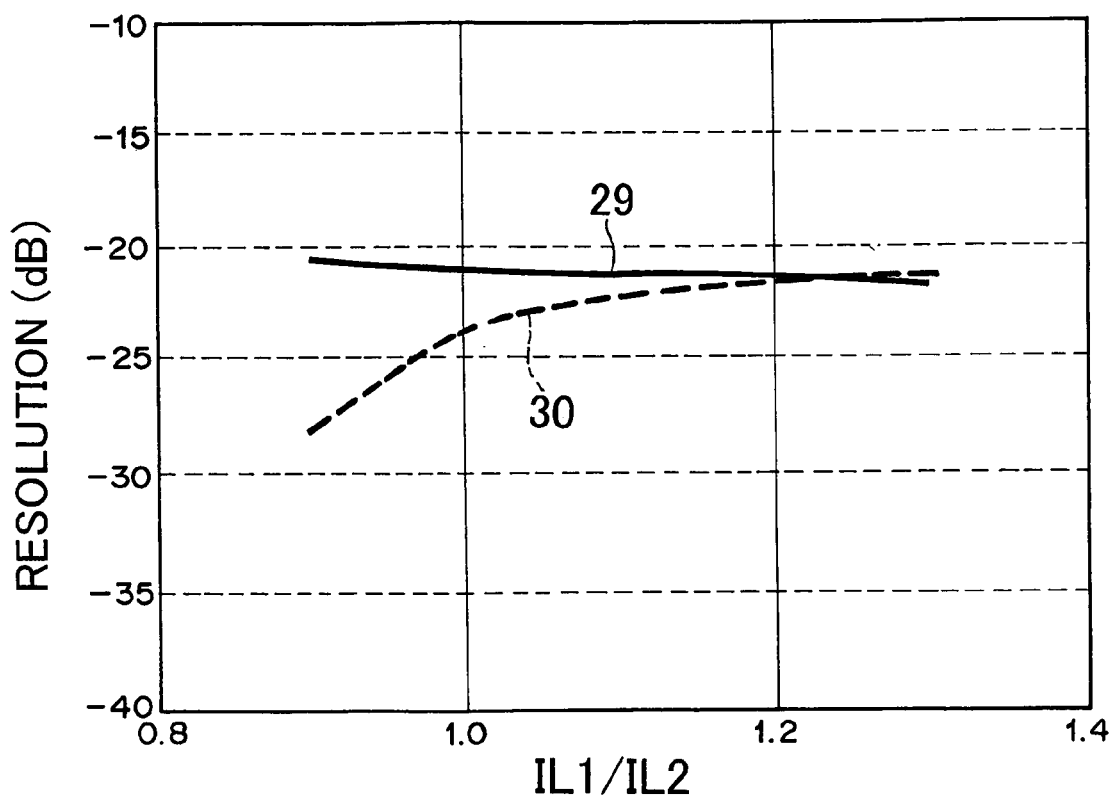
FIG. 3 is an explanatory diagram showing a relation between IL1/IL2 and an optical resolution.

The present inventors have found that an optical resolution in a case where the recording is performed into the portion L' corresponding to the land using a high-NA (e.g., 0.6 to 0.9, especially 0.8 to 0.9) optical head largely changes by a ratio of the reproduction signal amplitude IL1 of the long mark recorded in the portion L' corresponding to the land to the reproduction signal amplitude IL2 of the long mark recorded in the portion G' corresponding to the groove. FIG. 3 is a graphic diagram showing a ratio of IL1/IL2 on the abscissa and a resolution on the ordinate, showing a relation between the ratio of IL1/IL2 and the resolution with respect to a case (reference numeral 29) of the recording into the portion corresponding to the groove and a case (reference numeral 30) of the recording into the portion L' corresponding to the land. In FIG. 3, the resolution is defined as a ratio of the reproduction signal amplitude with respect to a 0.13 μm long mark shown in FIG. 2 and that of the reproduction signal amplitude with respect to a 0.67 μm long mark. As shown in FIG. 3, the optical resolution (reference numeral 30) in the case of the recording into the portion L' corresponding to the land using the high-NA optical head largely changes by the ratio IL1/IL2 of the reproduction signal amplitude IL1 of the longest mark recorded in the portion L' corresponding to the land to the reproduction signal amplitude IL2 of the longest mark recorded in the portion G' corresponding to the groove. On the other hand, the optical resolution (reference numeral 29) in the case of the recording performed into the portion G' corresponding to the groove hardly depends on the ratio IL1/IL2 of IL1 to IL2. Therefore, to match the optical resolution of the portion corresponding to the land with that of the portion corresponding to the groove as much as possible, the ratio IL1/IL2 of IL1 to IL2 may be appropriately regulated. That is, IL1/IL2 is set to be larger than 1 (IL1 is set to be larger than IL2) in order to match the optical resolution of the portion corresponding to the land with that of the portion corresponding to the groove. However, since it is difficult to increase the signal amplitude only of IL1 without changing the signal amplitude of IL2, IL2 needs to be reduced in order to increase IL1/IL2. When IL2 is reduced in this manner, a signal quality itself drops. Therefore, IL1/IL2 is set to be smaller than 1.3. Therefore, 1<(IL1/IL2)<1.3 is set.

Moreover, even in a case where a ratio of IS1/IL1 of the reproduction signal amplitude IS1 of the shortest mark with respect to the reproduction signal amplitude IL1 of the longest mark recorded in the portion L' corresponding to the land, and a ratio IS2/IL2 of the reproduction signal amplitude IS2 of the shortest mark with respect to the reproduction signal amplitude IL2 of the longest mark recorded in the portion G' corresponding to the groove satisfy a relation of 0.7<(IS1/IL1)/(IS2/IL2)<1, a difference of the resolution is remarkably reduced between the recording into the portion G' corresponding to the groove and the recording into the portion L' corresponding to the land.

Similarly, even when the difference $\Delta\phi=\phi a-\phi c$ between the phase $\phi a$ of the reflected light after the recording and the phase $\phi c$ of the reflected light before the recording is changed, a value of IL1/IL2 can be changed. In the case of a material of the recording layer 2 whose reflectance drops by the recording into the recording layer 2, when the difference $\Delta\phi=\phi a-\phi c$ between the phase $\phi a$ of the reflected light after the recording and the phase $\phi c$ of the reflected light before the recording satisfies a relation of $0°<\Delta\phi\leq 15°$, the difference of the resolution is remarkably reduced between the recording into the portion G' corresponding to the groove and the recording into the portion L' corresponding to the land in the same manner as shown in FIG. 3.

Furthermore, in the case of a material of the recording layer 2 whose reflectance increases by the recording into the recording layer 2, when the difference $\Delta\phi=\phi a-\phi c$ between the phase $\phi a$ of the reflected light after the recording and the phase $\phi c$ of the reflected light before the recording satisfies a relation of $-15°\leq\Delta\phi<0°$, the difference of the resolution is remarkably reduced between the recording into the portion G' corresponding to the groove and the recording into the portion L' corresponding to the land in the same manner as shown in FIG. 3.

Therefore, when laser light LB is applied to the recording layer 2 from the light-transmitting layer 3 side to record/reproduce the information, and when any of the above-described conditions ① to ④ is satisfied, the difference of the resolution is remarkably reduced between the recording into the portion G' corresponding to the groove and the recording into the portion L' corresponding to the land.

Figure 5:
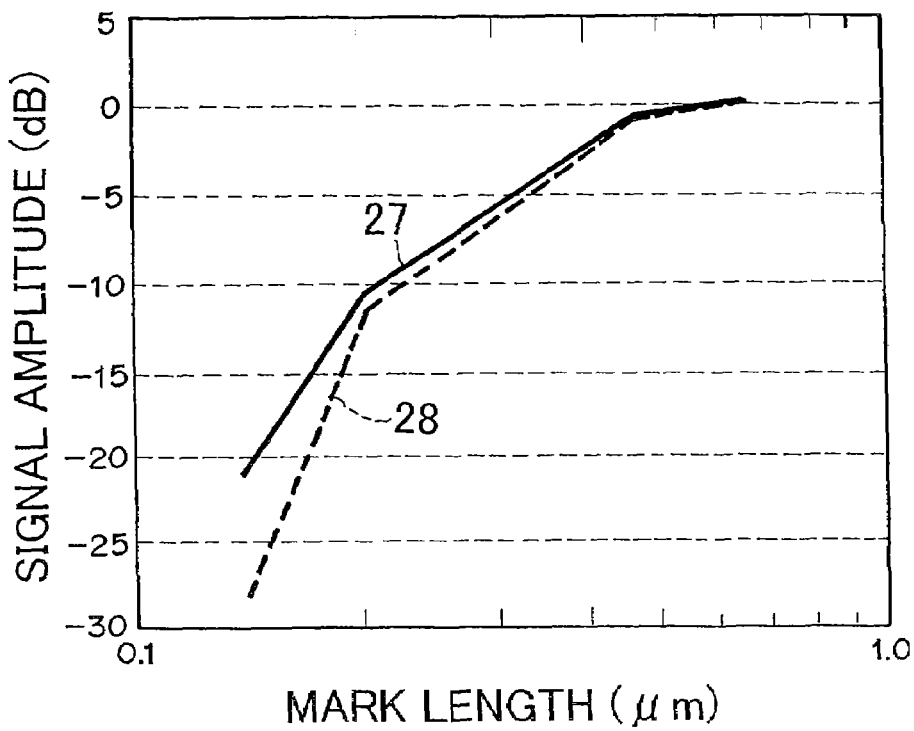
FIG. 5 is a diagram showing a relation between a mark length and a signal amplitude in a conventional optical information recording medium.

On the other hand, in a case where the laser light is applied from the back surface (lower surface) of the substrate 1 unlike FIG. 1, contrary to FIG. 5, since the drop of the reproduction signal amplitude of the short mark is remarkable in the portion G' corresponding to the groove, the present invention has any of the following characteristics ⑤ to ⑧.

⑤ When the nT to mT recording marks are formed using a certain modulation system, the reproduction signal amplitude IL1 of the longest mark mT recorded in the portion L' corresponding to the land, and the reproduction signal amplitude IL2 of the longest mark mT recorded in the portion G' corresponding to the groove satisfy a relation of 1<(IL2/IL1)<1.3.

⑥ When the nT to mT recording marks are formed using a certain modulation system, the reproduction signal amplitude IL1 of the longest mark mT recorded in the portion L' corresponding to the land, the reproduction signal amplitude IS1 of the shortest mark nT recorded in the portion L' corresponding to the land, the reproduction signal amplitude IL2 of the longest mark mT recorded in the portion G' corresponding to the groove and the reproduction signal amplitude IS2 of the shortest mark nT recorded in the portion G' corresponding to the groove satisfy a relation of 0.7<(IS2/IL2)/(IS1/IL1)<1.

⑦ When the recording is performed with respect to the recording layer 2, the reflectance of the recording layer 2 drops, and the difference $\Delta\phi=\phi a-\phi c$ between the phase $\phi a$ of reflected light after the recording and the phase $\phi c$ of the reflected light before the recording satisfies a relation of $0°<\Delta\phi\leq 15°$.

⑧ When the recording is performed with respect to the recording layer 2, the reflectance of the recording layer 2 increases, and the difference $\Delta\phi=\phi a-\phi c$ between the phase $\phi a$ of the reflected light after the recording and the phase $\phi c$ of the reflected light before the recording satisfies a relation of $-15°\leq\Delta\phi<0°$.

A phenomenon in which the resolution rapidly changes depending on the value of IL1/IL2 in the portion L' corresponding to the land in a case where the laser light is applied to the recording layer 2 from the light-transmitting layer 3 side or in the portion G' corresponding to the groove in a case where the laser light is applied to the recording layer 2 from the substrate 1 side is a phenomenon determined only by the optical phase difference between the reflected lights before/after the recording. That is, even in an optical disk different in a composition or thickness of the recording layer 2, a type or thickness of the dielectric layer or the like, a satisfactory resolution can be realized, when IL1/IL2 is designed into a desired value.

Effects of the present invention will be further described in accordance with examples of the present invention together with comparative examples out of the scope of the present invention.

EXAMPLE 1

A disc-shaped PC substrate having a thickness of 1.1 mm was used as a substrate, and a 100 nm thick Al reflective film, a 15 nm thick ZnS—SiO$_2$ dielectric layer, a 15 nm thick GeSbTe recording layer, and a 40 to 85 nm thick ZnS—SiO$_2$ dielectric layer were stacked/formed on a land/groove formed surface of the substrate by sputtering. On the layers, a 0.1 mm thick PC film was bonded as a light-transmitting layer by an ultraviolet cured resin.

After initializing (crystallizing) the above-described disk (recording medium), the disk was rotated at a linear speed of 5.1 m/s, laser light was applied from a light-transmitting layer side using an optical head having a wavelength of 405 nm, NA=0.85, recording was performed into both a portion L' corresponding to a land and a portion G' corresponding to a groove on a linear density condition of 0.116 μm/bit, and reproduction characteristics were measured. Since (1-7) modulation was used as a modulation system, a mark length of a longest mark was 8 T, and a mark length of a shortest mark was 2 T. IL1 and IL2 correspond to an amplitude of an 8 T reproduction signal, and IS1 and IS2 correspond to an amplitude of a 2 T reproduction signal.

Table 1 shows a relation between optical characteristics and recording/reproducing characteristics at a time when the thickness of the ZnS—SiO$_2$ dielectric layer on the recording layer is changed. Since the recording layer is in a crystallized state before the recording, and brought into an amorphous state after the recording, $\phi a$ corresponds to a phase of reflected light at a time when the recording layer is in the amorphous state, and $\phi c$ corresponds to a phase of the reflected light at a time when the recording layer is in the crystallized state.

It is to be noted that a recording power was set to such a power that a secondary higher harmonic wave distortion of an 8 T reproduction signal was minimized in each of the portion L' corresponding to the land and the portion G' corresponding to the groove, but as shown in Table 1, the recording power of the portion L' corresponding to the land was substantially equal to that of the portion G' corresponding to the groove, and a difference between them was 5% or less.

recording was performed into both a portion L' corresponding to a land and a portion G' corresponding to a groove on a linear density condition of 0.116 μm/bit, and reproduction characteristics were measured. Since (1-7) modulation was used as a modulation system, a mark length of a longest mark was 8 T, and a mark length of a shortest mark was 2 T. IL1 and IL2 correspond to an amplitude of an 8 T reproduction signal, and IS1 and IS2 correspond to an amplitude of a 2 T reproduction signal.

TABLE 1

| ZnS—SiO$_2$ film thickness (nm) | Reflectance before recording (%) | Refl. after rec. (%) | $\Phi_a$–$\Phi_c$ (deg.) | IL1/ IL2 | (IS1/IL1)/ (IS2/IL2) | Jitter (%) L' | Jitter (%) G' | Rec. power (mW) L' | Rec. power (mW) G' |
|---|---|---|---|---|---|---|---|---|---|
| 40 | 18 | 1 | −5 | 0.93 | 0.55 | 8.7 | 18 | 4.5 | 4.3 |
| 50 | 19 | 1.5 | 0 | 1 | 0.65 | 9 | 15 | 4.6 | 4.5 |
| 60 | 20 | 2 | 4 | 1.08 | 0.8 | 9.5 | 11 | 4.8 | 4.7 |
| 70 | 17 | 0.5 | 10 | 1.2 | 0.92 | 9.8 | 10.5 | 4.6 | 4.6 |
| 80 | 15 | 0.3 | 15 | 1.28 | 0.98 | 10 | 9.5 | 4.3 | 4.2 |
| 85 | 14 | 0.2 | 20 | 1.34 | 1.03 | 13 | 9.2 | 4.2 | 4 |

In the case of the recording layer whose reflectance drops by the recording, it has been found that substantially equal jitter characteristics are obtained in the portion L' corresponding to the land and the portion G' corresponding to the groove, when one of conditions $0° < \Delta\phi \leq 15°$, $1 < IL1/IL2 < 1.3$, and $0.7 < (IS1/IL1)/(IS2/IL2) < 1.0$ is satisfied. Especially, in $1.1 < IL1/IL2 < 1.3$, there is little difference of the jitter characteristics between the portion L' corresponding to the land and the portion G' corresponding to the groove, and the jitters are balanced.

EXAMPLE 2

A disc-shaped PC substrate having a thickness of 1.1 mm was used as a substrate, and a 100 nm thick Al reflective film, a 25 nm thick ZnS—SiO$_2$ dielectric layer, a 15 nm thick GeSbTe recording layer, a 25 nm thick ZnS—SiO$_2$ dielectric layer, a 30 nm thick SiO$_2$ dielectric layer, and a 50 to 75 nm thick ZnS—SiO$_2$ dielectric layer were successively stacked/formed on a land/groove formed surface of the substrate by sputtering. On the layers, a 0.1 mm thick PC film was bonded as a light-transmitting layer by an ultraviolet cured resin.

After initializing (crystallizing) the above-described disk, the dark was rotated at a linear speed of 5.1 m/s, laser light was applied from a light-transmitting layer side using an optical head having a wavelength of 405 nm, NA=0.85, Table 2 shows a relation between optical characteristics and recording/reproducing characteristics at a time when the thickness of the ZnS—SiO$_2$ dielectric layer of an uppermost layer is changed. Since the recording layer is in a crystallized state before the recording, and brought into an amorphous state after the recording, φa corresponds to a phase of reflected light at a time when the recording layer is in the amorphous state, and φc corresponds to a phase of the reflected light at a time when the recording layer is in the crystallized state.

It is to be noted that in the present example, a recording power was set to such a power that symmetry of an eye pattern in recording a random signal was optimized in each of the portion L' corresponding to the land and the portion G' corresponding to the groove, but as shown in Table 2, the recording power of the portion L' corresponding to the land was substantially equal to that of the portion G' corresponding to the groove, and a difference between them was 5% or less.

TABLE 2

| ZnS—SiO$_2$ film thickness (nm) | Reflectance before recording (%) | Refl. after rec. (%) | $\Phi_a$–$\Phi_c$ (deg.) | IL1/ IL2 | (IS1/IL1)/ (IS2/IL2) | Jitter (%) L' | Jitter (%) G' | Rec. power (mW) L' | Rec. power (mW) G' |
|---|---|---|---|---|---|---|---|---|---|
| 50 | 5.8 | 20 | 4 | 0.95 | 0.55 | 8.4 | 17 | 4.2 | 4.0 |
| 55 | 6 | 21 | 0 | 1 | 0.68 | 8.8 | 14.5 | 4.3 | 4.1 |
| 60 | 6.2 | 22 | −3 | 1.04 | 0.75 | 9.1 | 10.5 | 4.3 | 4.2 |
| 65 | 6.5 | 23 | −8 | 1.13 | 0.9 | 9.5 | 9.5 | 4.3 | 4.2 |
| 70 | 7 | 24 | −14 | 1.27 | 0.97 | 9.8 | 8.8 | 4.4 | 4.2 |
| 75 | 8 | 26 | −18 | 1.32 | 1.02 | 13 | 8.5 | 4.5 | 4.3 |

In a case where the reflectance of the recording layer increases by the recording, it has been found that substantially equal jitter characteristics are obtained in the portion L' corresponding to the land and the portion G' corresponding to the groove, when one of conditions $-15° \leq \Delta\phi \leq 0°$, $1 < IL1/IL2 < 1.3$, and $0.7 < (IS1/IL1)/(IS2/IL2) < 1.0$ is satisfied. Especially, in $1.1 < IL1/IL2 < 1.3$, there is little difference of the jitter characteristics between the portion L' corresponding to the land and the portion G' corresponding to the groove, and the jitters are balanced.

EXAMPLE 3

A disc-shaped PC substrate having a thickness of 0.6 mm was used as a substrate, and a 40 to 85 nm thick ZnS—SiO$_2$ dielectric layer, a 15 nm thick GeSbTe recording layer, a 15 nm thick ZnS—SiO$_2$ dielectric layer, and a 100 nm thick Al reflective film were successively stacked/formed on a land/groove formed surface of the substrate by sputtering. On the layers, a 0.6 mm thick glass substrate was bonded by an ultraviolet cured resin.

After initializing (crystallizing) the above-described disk (recording medium), the disk was rotated at a linear speed of 3.5 m/s, laser light was applied from the back surface of the PC substrate using an optical head having a wavelength of 405 nm, NA=0.65, recording was performed into both a portion L' corresponding to a land and a portion G' corresponding to a groove on a linear density condition of 0.16 μm/bit, and reproduction characteristics were measured. Since (1-7) modulation was used as a modulation system, a mark length of a longest mark was 8 T, and a mark length of a shortest mark was 2 T. IL1 and IL2 correspond to an amplitude of an 8 T reproduction signal, and IS1 and IS2 correspond to an amplitude of a 2 T reproduction signal.

Table 3 shows a relation between optical characteristics and the recording/reproducing characteristics at a time when the thickness of the ZnS—SiO$_2$ dielectric layer on the PC substrate is changed. Since the recording layer is in a crystallized state before the recording, and brought into an amorphous state after the recording, φa corresponds to a phase of reflected light at a time when the recording layer is in the amorphous state, and φc corresponds to a phase of the reflected light at a time when the recording layer is in the crystallized state.

It is to be noted that in the present example, a recording power was set to such a power that a secondary higher harmonic wave distortion of the 8 T reproduction signal was minimized in each of the portion L' corresponding to the land and the portion G' corresponding to the groove, but as shown in Table 3, the recording power of the portion L' corresponding to the land was substantially equal to that of the portion G' corresponding to the groove, and a difference between them was 5% or less.

equal jitter characteristics are obtained in the portion L' corresponding to the land and the portion G' corresponding to the groove, when one of conditions 0°<Δφ≦15°, 1<IL2/IL1<1.3, and 0.7<(IS2/IL2)/(IS1/IL1)<1.0 is satisfied. Especially, in 1.1<IL2/IL1<1.3, there is little difference of the jitter characteristics between the portion L' corresponding to the land and the portion G' corresponding to the groove, and the jitters are balanced.

EXAMPLE 4

A disc-shaped PC substrate having a thickness of 0.6 mm was used as a substrate, and a 50 to 75 nm thick ZnS—SiO$_2$ dielectric layer, a 30 nm thick SiO$_2$ dielectric layer, a 25 nm thick ZnS—SiO$_2$ dielectric layer, a 15 nm thick GeSbTe recording layer, a 25 nm thick ZnS—SiO$_2$ dielectric layer, and a 100 nm thick Al reflective film were successively stacked/formed on a land/groove formed surface of the substrate by sputtering. On the layers, a 0.6 mm thick glass substrate was bonded by an ultraviolet cured resin.

After initializing (crystallizing) the above-described disk, the disk was rotated at a linear speed of 3.5 m/s, laser light was applied from the back surface of the PC substrate using an optical head having a wavelength of 405 nm, NA=0.65, recording was performed into both a portion L' corresponding to a land and a portion G' corresponding to a groove on a linear density condition of 0.16 μm/bit, and reproduction characteristics were measured. Since (1-7) modulation was used as a modulation system, a mark length of a longest mark was 8 T, and a mark length of a shortest mark was 2 T. IL1 and IL2 correspond to an amplitude of an 8 T reproduction signal, and IS1 and IS2 correspond to an amplitude of a 2 T reproduction signal.

Table 4 shows a relation between optical characteristics and recording/reproducing characteristics at a time when the thickness of the ZnS—SiO$_2$ dielectric layer just on the substrate is changed. Since the recording layer is in a crystallized state before the recording, and brought into an amorphous state after the recording, φa corresponds to a phase of reflected light at a time when the recording layer is in the amorphous state, and φc corresponds to a phase of the reflected light at a time when the recording layer is in the crystallized state.

It is to be noted that in the present example, a recording power was set to such a power that symmetry of an eye

TABLE 3

| ZnS—SiO$_2$ film thickness (nm) | Reflectance before recording (%) | Refl. after rec. (%) | $\Phi_a-\Phi_c$ (deg.) | IL2/IL1 | (IS2/IL2)/(IS1/IL1) | Jitter (%) L' | Jitter (%) G' | Rec. power (mW) L' | Rec. power (mW) G' |
|---|---|---|---|---|---|---|---|---|---|
| 40 | 18 | 1 | −5 | 0.93 | 0.55 | 8.5 | 17 | 5.8 | 5.6 |
| 50 | 19 | 1.5 | 0 | 1 | 0.68 | 8.8 | 14.5 | 5.8 | 5.6 |
| 60 | 20 | 2 | 4 | 1.08 | 0.75 | 9.3 | 10.6 | 6 | 5.8 |
| 70 | 17 | 0.5 | 10 | 1.2 | 0.9 | 9.6 | 10.2 | 5.8 | 5.6 |
| 80 | 15 | 0.3 | 15 | 1.28 | 0.97 | 9.9 | 10 | 5.6 | 5.4 |
| 85 | 14 | 0.2 | 20 | 1.34 | 1.02 | 12.9 | 9.3 | 5.5 | 5.3 |

In a case where the reflectance of the recording layer drops by the recording, it has been found that substantially pattern in recording a random signal was optimized in each of the portion L' corresponding to the land and the portion G' corresponding to the groove, but as shown in Table 4, the recording power of the portion L' corresponding to the land was substantially equal to that of the portion G' corresponding to the groove, and a difference between them was 5% or less.

TABLE 4

| ZnS—SiO$_2$ film thickness (nm) | Reflectance before recording (%) | Refl. after rec. (%) | $\Phi_a-\Phi_c$ (deg.) | IL2/IL1 | (IS2/IL2)/(IS1/IL1) | Jitter (%) L' | Jitter (%) G' | Rec. power (mW) L' | Rec. power (mW) G' |
|---|---|---|---|---|---|---|---|---|---|
| 50 | 5.8 | 20 | 4 | 0.95 | 0.55 | 8.2 | 16.5 | 5.5 | 5.4 |
| 55 | 6 | 21 | 0 | 1 | 0.68 | 8.6 | 14.4 | 5.5 | 5.3 |
| 60 | 6.2 | 22 | −3 | 1.04 | 0.75 | 9 | 10.2 | 5.6 | 5.4 |
| 65 | 6.5 | 23 | −8 | 1.13 | 0.9 | 9.4 | 9.3 | 5.6 | 5.6 |
| 70 | 7 | 24 | −14 | 1.27 | 0.97 | 9.7 | 8.7 | 5.8 | 5.6 |
| 75 | 8 | 26 | −18 | 1.32 | 1.02 | 12.8 | 8.4 | 6 | 5.8 |

In a case where the reflectance of the recording layer increases by the recording, it has been found that substantially equal jitter characteristics are obtained in the portion L' corresponding to the land and the portion G' corresponding to the groove, when one of conditions $-15° \leq \Delta\phi < 0°$, $1 < IL2/IL1 < 1.3$, and $0.7 < (IS2/IL2)/(IS1/IL1) < 1.0$ is satisfied. Especially, in $1.1 < IL2/IL1 < 1.3$, there is little difference of the jitter characteristics between the portion L' corresponding to the land and the portion G' corresponding to the groove, and the jitters are balanced.

Figure 4:
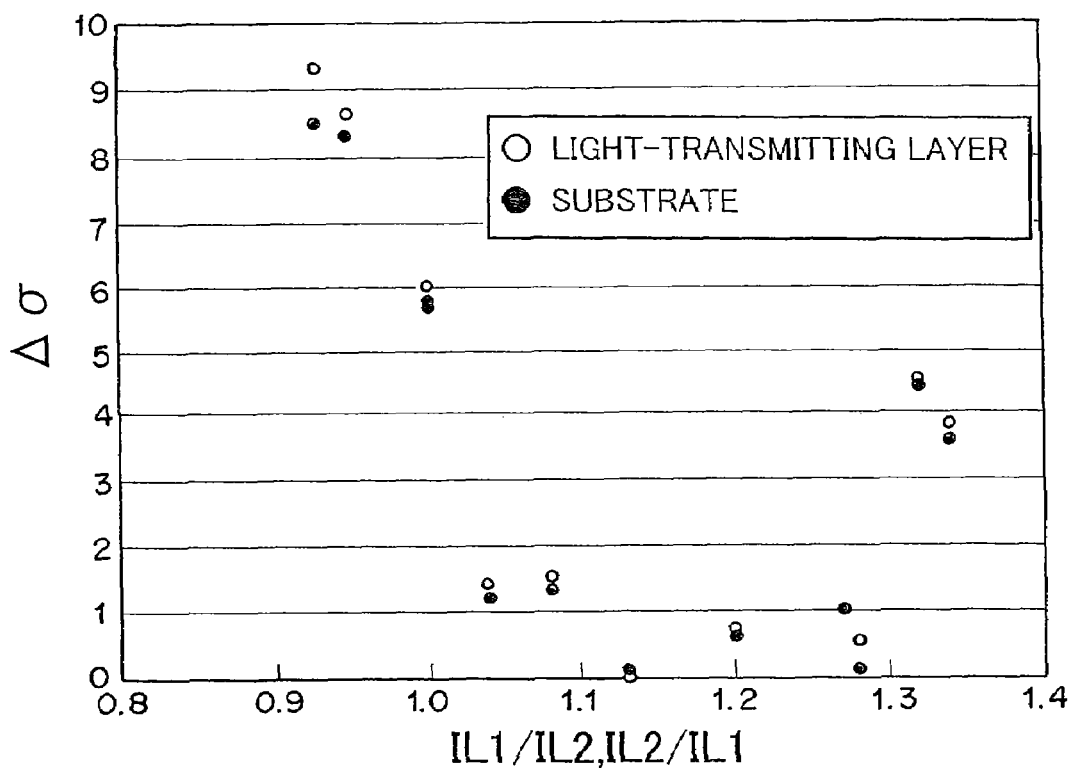
FIG. 4 is an explanatory diagram showing a relation between IL1/IL2 or IL2/IL1 and a jitter of a portion corresponding to a land or a portion corresponding to a groove.

FIG. 4 shows the results of Tables 1 to 4 together. In FIG. 4, the abscissa shows IL1/IL2 in a case where the laser light is applied to the recording layer from the light-transmitting layer side (corresponding to Examples 1 and 2), and IL2/IL1 in a case where the laser light is applied to the recording layer from the PC substrate side (corresponding to Examples 3 and 4), respectively. The ordinate of FIG. 4 shows an absolute value $\Delta\sigma$ of the difference of the jitter between the portion L' corresponding to the land and the portion G' corresponding to the groove. As seen from FIG. 4, the jitters of the portion L' corresponding to the land and the portion G' corresponding to the groove are balanced very well irrespective of the decrease or increase of the reflectance of the recording layer by the recording in the case of $1 < IL1/IL2 < 1.3$, especially $1.1 < IL1/IL2 < 1/3$, when the laser light is applied to the recording layer from the light-transmitting layer side, or in the case of $1 < IL2/IL1 < 1.3$, especially $1.1 < IL2/IL1 < 1.3$, when the laser light is applied to the recording layer from a PC substrate side.

As seen from FIG. 5, even by the use of an optical disk having a phase difference of substantial 0, when the linear recording density is low, the resolution of the portion corresponding to the land is substantially equal to that of the portion corresponding to the groove, and therefore a large effect cannot be obtained even by the use of the present invention in a case where the recording/reproducing is performed at a low density. With respect to the optical disk whose phase difference is substantially 0, a length of a recording mark in which the resolution differs by 3 dB or more in the portions corresponding to the land and groove is 0.18 μm or less, as seen from FIG. 5, in a case where an optical head, for example, having λ=405 nm, NA=0.85 is used. Considering that a beam diameter of the optical head is proportional to λ/NA, and assuming that the length of the shortest mark formed on the optical disk is ML, a ratio a=NA●ML/λ of ML to λ/NA is an index of the recording density. When FIG. 5 is reviewed with this index, a=0.38 or less at the recording density at which the resolution differs by 3 dB or more. When a is 0.25 or less, there is exceeded an optical diffraction limit, and the signal itself is not obtained. Therefore, the recording density at which an effect of enhancing the characteristics is obtained by the use of the optical information recording medium according to the present invention corresponds to a range of 0.25<a<0.38. It is to be noted that although not shown in FIG. 5, the resolution differs by 3 dB or more in a case where a is 0.38 or less even by the use of the optical head having NA=0.65. The conditions on which the resolution differs by 3 dB are the same as conditions on which a ratio of IS1/IL1 to IS2/IL2 is 0.7, and correspond to conditions on which satisfactory characteristics are obtained in the portions corresponding to the land and the groove as described in the present description.

INDUSTRIAL APPLICABILITY

As described above, according to the present invention, recording can be performed with respect to both a portion corresponding to a land and a portion corresponding to a groove of a recording layer at a high recording density, and it is therefore possible to obtain a large-capacity optical information recording medium.

The invention claimed is:
1. An optical information recording medium in which light is projected in a spot to thereby record/reproduce information and in which at least a recording layer and a light-transmitting layer are disposed in this order on a substrate having a guide groove for tracking of the spotted light and in which the light is projected in the spot to the recording layer from the side of the light-transmitting layer to record the information both in a first portion of the recording layer corresponding to a flat portion between mutually adjacent guide grooves and a second portion of the recording layer corresponding to the inside of the guide groove,
    wherein recording marks with mark lengths nT to mT (where T is a unit length, n, m are integers of one or more, n<m) are formed on both the first and second portions, and an amplitude IL1 of a reproduced signal from the longest recording mark with the mark length mT recorded on the first portion, an amplitude IS1 of a reproduced signal from the shortest recording mark with the mark length nT recorded on the first portion, an amplitude IL2 of a reproduced signal from the longest recording mark with the mark length mT recorded on the second portion, and an amplitude IS2 of a reproduced signal from the shortest recording mark with the mark length nT recorded on the second portion satisfy a relation of $0.7<(IS1/IL1)/(IS2/IL2)<1$.

2. An optical information recording medium in which light is projected in a spot to thereby record/reproduce information and in which at least a recording layer is disposed on a substrate having a guide groove for tracking of the spotted light and in which the light is projected in the spot to the recording layer from the side of the substrate to record the information both in a first portion of the recording layer corresponding to a flat portion between mutually adjacent guide grooves and a second portion of the recording layer corresponding to the inside of the guide groove, wherein recording marks with mark lengths nT to mT (where T is a unit length, n, m are integers of one or more, n<m) are formed on both the first and second portions, and an amplitude IL1 of a reproduced signal from the longest recording mark with the mark length mT recorded on the first portion, an amplitude IS1 of a reproduced signal from the shortest recording mark with the mark length nT recorded on the first portion, an amplitude IL2 of a reproduced signal from the longest recording mark with the mark length mT recorded on the second portion, and an amplitude IS2 of a reproduced signal from the shortest recording mark with the mark length nT recorded on the second portion satisfy a relation of $0.7<(IS2/IL2)/(IS1/IL1)<1$.

3. A method of recording/reproducing optical information, comprising the steps of: projecting light in spots with respect to both first and second portions of a recording layer of the optical information recording medium according to claim 1; and forming recording marks having mark lengths nT to mT to perform recording, so that IL1, IS1, IL2 and IS2 satisfy a relation of $0.7<(IS1/IL1)/(IS2/IL2)<1$.

4. A method of recording/reproducing optical information, comprising the steps of: projecting light in spots with respect to both first and second portions of a recording layer of the optical information recording medium according to claim 2; and forming recording marks having mark lengths nT to mT to perform recording, so that IL1, IS1, IL2 and IS2 satisfy a relation of $0.7<(IS2/IL2)/(IS1/IL1)<1$.

* * * * *